(12) United States Patent
Gribble et al.

(10) Patent No.: US 8,159,464 B1
(45) Date of Patent: Apr. 17, 2012

(54) ENHANCED FLIGHT DISPLAY WITH IMPROVED TOUCHSCREEN INTERFACE

(75) Inventors: David A. Gribble, Cedar Rapids, IA (US); Jan M. Heeren, Fairfax, IA (US); Tony B. Vander Velden, Cedar Rapids, IA (US); Colin D. Reed, Cedar Rapids, IA (US); Bryan C. Schultz, Marion, IA (US); David L. Leedom, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 824 days.

(21) Appl. No.: 12/284,909

(22) Filed: Sep. 26, 2008

(51) Int. Cl.
*G06F 3/041* (2006.01)
*G06F 7/00* (2006.01)

(52) U.S. Cl. .......................... 345/173; 178/18.01; 701/3

(58) Field of Classification Search .................. None
See application file for complete search history.

(56) References Cited

U.S. PATENT DOCUMENTS

| | | | | |
|---|---|---|---|---|
| 6,112,141 | A * | 8/2000 | Briffe et al. | 701/14 |
| 6,952,630 | B2 * | 10/2005 | Hedrick | 701/3 |
| 7,268,702 | B2 * | 9/2007 | Chamas et al. | 340/975 |
| 2008/0231634 | A1 * | 9/2008 | Gyde et al. | 345/427 |
| 2009/0021490 | A1 * | 1/2009 | Stickels | 345/173 |
| 2011/0006983 | A1 * | 1/2011 | Grothe | 345/157 |

* cited by examiner

*Primary Examiner* — Andrew L Sniezek
(74) *Attorney, Agent, or Firm* — Donna P. Suchy; Daniel M. Barbieri

(57) ABSTRACT

An enhanced flight display system for an aircraft, including primary display controls, a flight display, and processing elements. The primary display controls provide a primary capability for performing defined display functions. The flight display includes a touchscreen input device being partitioned into a plurality of fixed touch regions that are responsive to touch so as to provide a secondary capability for performing defined flight display functions. The processing elements are operatively associated with the primary display controls and the flight display for implementing the defined flight display functions in response to utilization of the primary display controls or the touch of one of the touch regions, wherein operation of the fixed touch regions is configured to be independent of the primary display controls. This system provides an intuitive, aircraft optimized touchscreen interface to an aircraft flight display with no or minimal display design changes.

11 Claims, 15 Drawing Sheets

ENHANCED FLIGHT DISPLAY WITH IMPROVED TOUCHSCREEN INTERFACE

BACKGROUND OF THE INVENTION

1. Field of the Invention

The present invention relates generally to aircraft display systems and more particularly to a flight display with an enhanced touchscreen interface for providing a secondary mechanism for performing primary flight display functions.

2. Description of the Related Art

Current primary flight displays (PFDs) for aircraft use a combination of display menus, bezel buttons, and display control panels to allow the pilot to control available functions.

Emerging PFD's may use a touchscreen interface. Current capacitive or resistive touchscreen technology resolution is relatively low compared to display resolution requiring that "touchable" menu items must be relatively large. This means that existing formats or menu designs are not suitable and must be redesigned.

Current touchable user interfaces are optimized for precision operation or portable computing applications and are not suitable for the unique nature of an airplane cockpit, especially due to consideration of vibration levels, accelerations that may be experienced during aircraft maneuvers, and the critical and often urgent nature of the pilot user interface operations.

SUMMARY OF THE INVENTION

In a broad aspect, the present invention is an enhanced flight display system for an aircraft, including primary display controls, a flight display, and processing means. The primary display controls provide a primary capability for performing defined display functions. The flight display includes a touchscreen input device being partitioned into a plurality of fixed touch regions that are responsive to touch so as to provide a secondary capability for performing defined flight display functions. The processing means are operatively associated with the primary display controls and the flight display for implementing the defined flight display functions in response to utilization of the primary display controls or the touch of one of the touch regions, wherein operation of the fixed touch regions is configured to be independent of the primary display controls. This system provides an intuitive, aircraft optimized touchscreen interface to an aircraft flight display with no or minimal display design changes.

The present invention separates the flight display into large, but invisible touchable areas. These areas may be referred to as Hot Spots. Each touchable area has a defined, well known function. The touchable areas are sufficiently large so as to allow accurate pilot operation using low resolution touchscreen technology, even in a turbulent and/or accelerated aircraft cockpit environment.

The operation of a touchable area may result in the direct operation of a flight display function. The direct operation may consist of on/off operation, or toggling through a predefined set of states. The operation of touchable area may result in the display of a secondary touchable menu that will allow operation of a flight display function.

A function is provided to enable the pilot to find the invisible touchable areas. This function may serve as a training aid to assist the pilot in becoming accustomed to using the touchable areas.

The use of an enhanced touchscreen interface to a flight display is particularly advantageous in a single pilot environment, offering significant operational safety improvements.

DETAILED DESCRIPTION OF THE INVENTION

Figure 1:
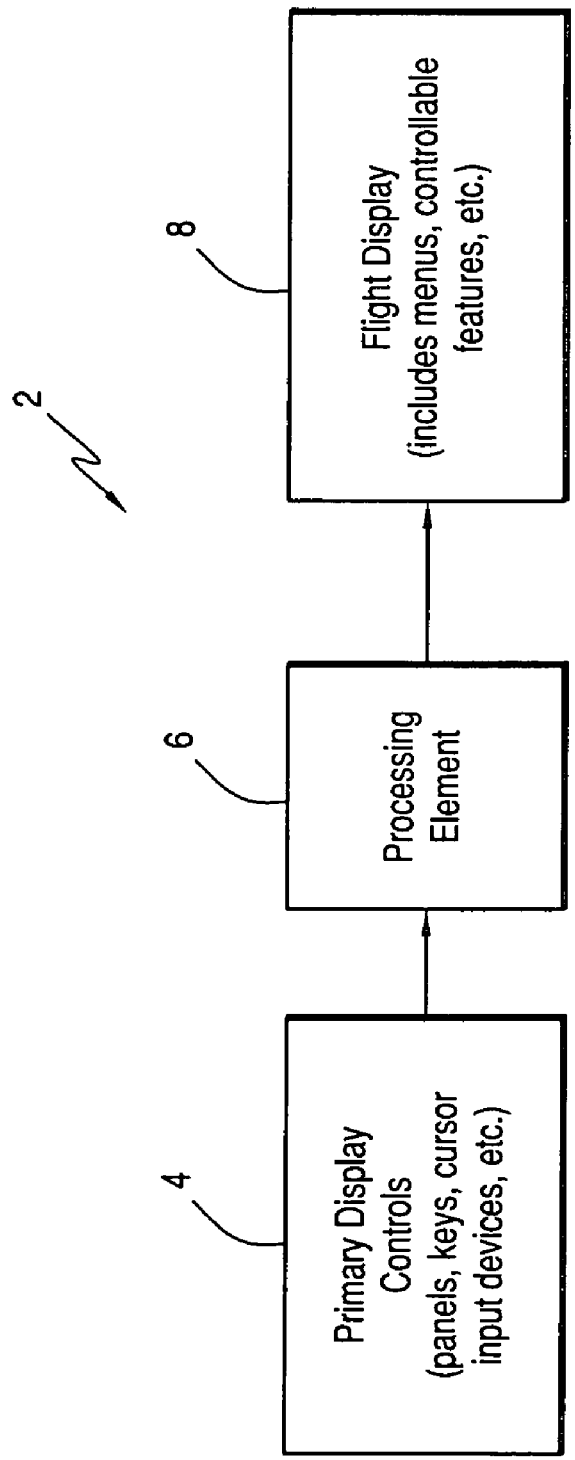
FIG. 1 is a simplified block diagram of a conventional flight display without a touchscreen interface.

Referring now to the drawings and the characters of reference marked thereon, FIG. 1 shows a conventional flight display without a touchscreen interface, designated generally as 2. It includes controls 4 (such as panel, keys, switches, input devices), a processing element 6 that converts the actions of those controls into desired display actions, and a flight display 8.

Figure 2:
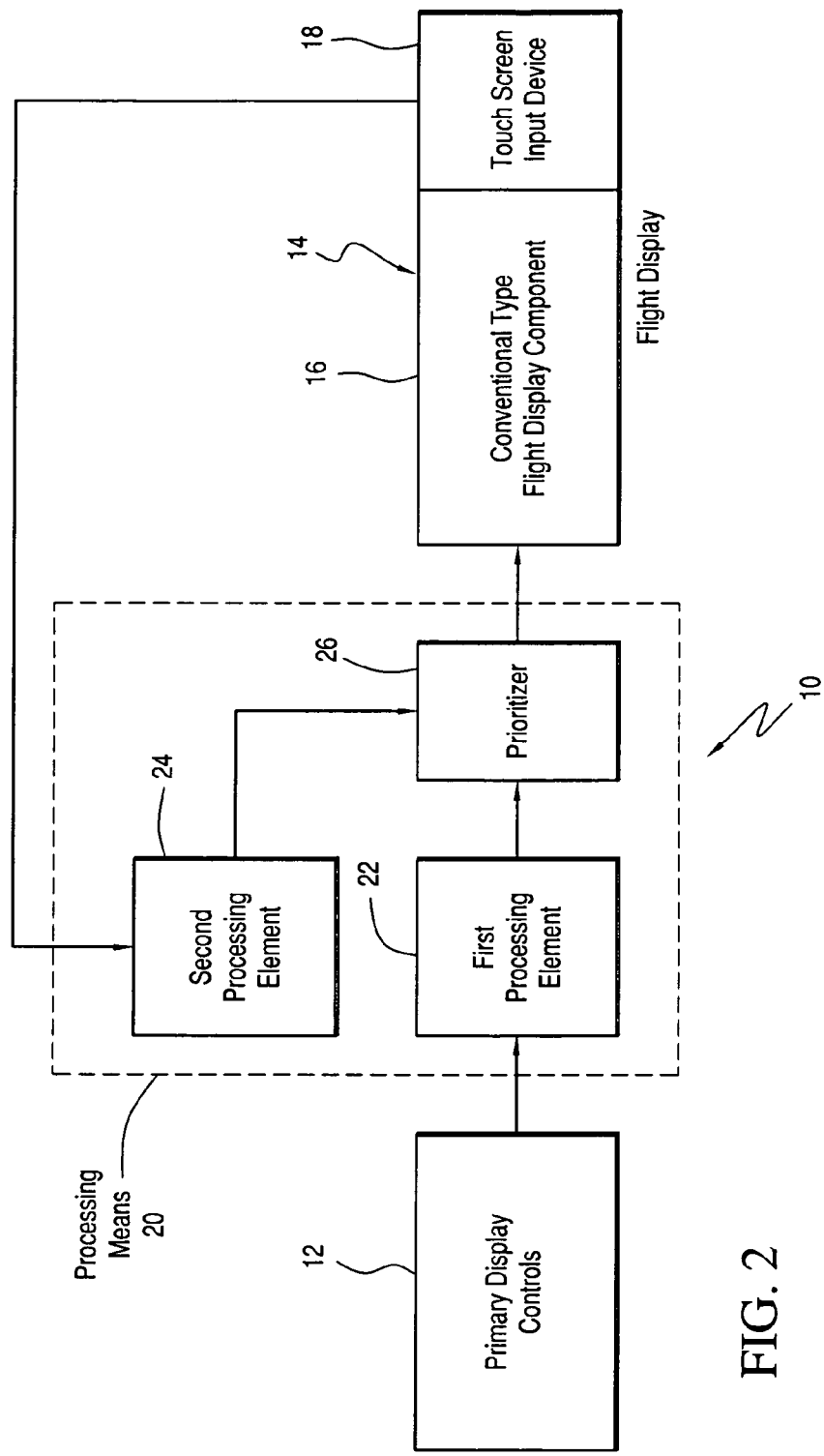
FIG. 2 is a simplified block diagram of the enhanced flight display system of the present invention.

Referring to FIG. 2, the enhanced flight display system of the present invention is illustrated, designated generally as 10. The enhanced flight display system 10 includes primary display controls 12 for providing a primary capability for performing defined display functions. These primary display controls 12 may include, for example, panels, keys, cursor input devices, etc. The system 10 includes a flight display 14 having a conventional display component 16 and a touchscreen input device 18. The conventional display component 16 includes typical elements such as menus, controllable features, etc. The flight display 14 is partitioned into a plurality of fixed touch regions that are responsive to touch so as to provide a secondary capability for performing defined flight display functions.

Processing means 20 is operatively associated with the primary display controls 12 and the flight display 14 for implementing the defined flight display functions in response to utilization of the primary display controls or the touch of one of the touch regions. Operation of the fixed touch regions is configured to be independent of the primary display controls, i.e. it is independent of the use of the existing display menus or controls. Both can do the same thing in an independent manner.

The processing means 20 preferably includes a first processing element 22 operatively connected to the primary display controls for processing output signals from the primary display controls to provide a first set of potential display action functions. A second processing element 24 processes output functions from the touchscreen input device 18 to provide a second set of potential display action functions. A prioritizer 26 receives the first set of potential display action functions and the second set of potential display action functions and applies a set of priority driven rules for determining the display action. Thus, the prioritizer allows the use of both conventional and touch interfaces on the same display. The first processing element 22 and the second processing element 24 may be implemented as separate units or as an integral processing element. The prioritizer 26 allows either processing element 22 or 24 to control display functions in a cooperative manner. The prioritizer is necessary to prevent control interference between processors, which could result in misleading operation.

The touch regions may provide different types of input modalities. For example, the touch region may provide a touchable menu structure on the touchscreen upon touching thereof, or touching it may provide an on/off toggle.

For ease in use, the fixed touch regions may be highlighted visually when the display touch function is activated outside of a fixed touch region. The highlighting may be accomplished by means of, for example, translucent shading or display of a border around the fixed touch region. It may appear in response to a touch outside a fixed touch region, or in response to a control input of any other type. Furthermore, the highlighting may be temporary (lasting until the touch or control input is removed), time-limited (lasting for a fixed duration after a touch or control input), or permanent (lasting until a second touch or control input occurs).

Figure 3:
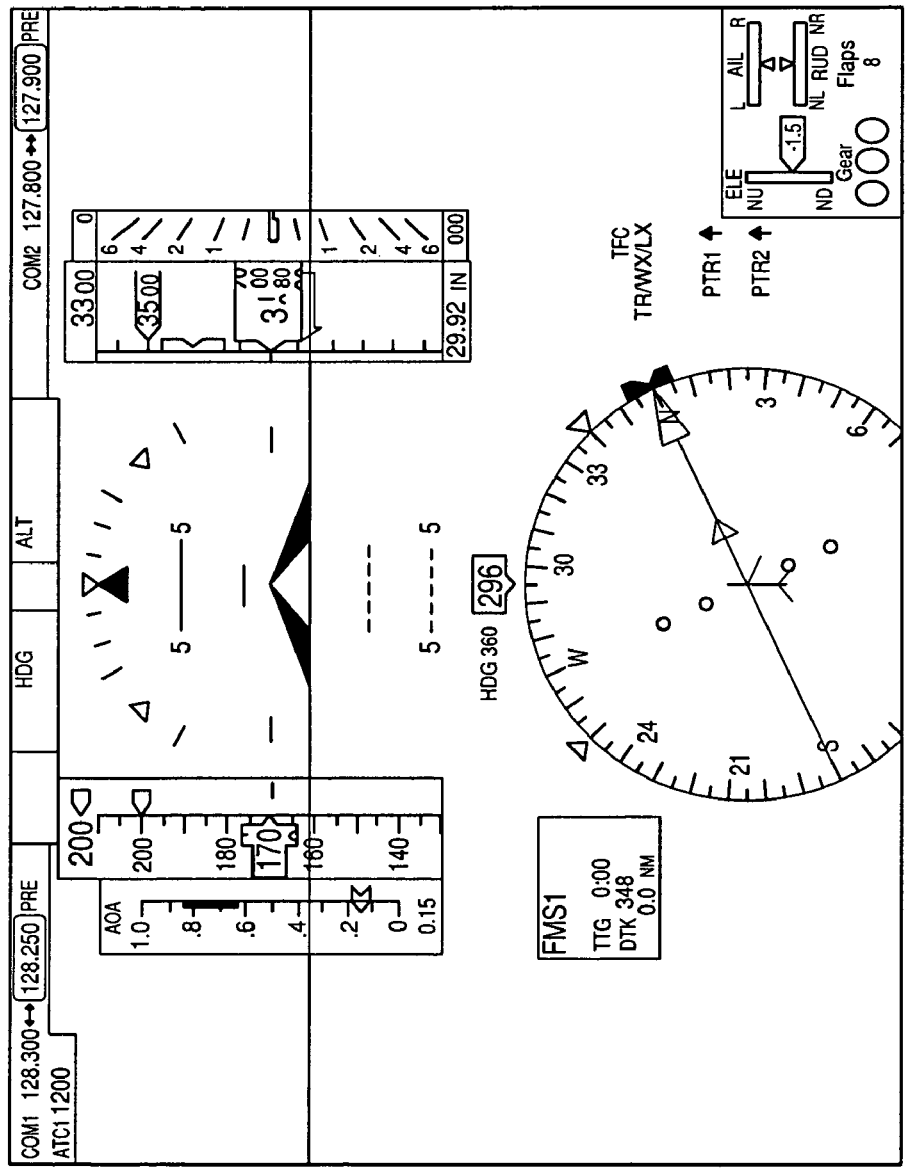
FIG. 3 is a representative flight display of the present invention in which the touchable control areas are not readily apparent.

Referring now to FIG. 3, a representative flight display is illustrated. It is noted that the touchable control areas are not shown on the display, to prevent display clutter and pilot confusion.

Figure 4:
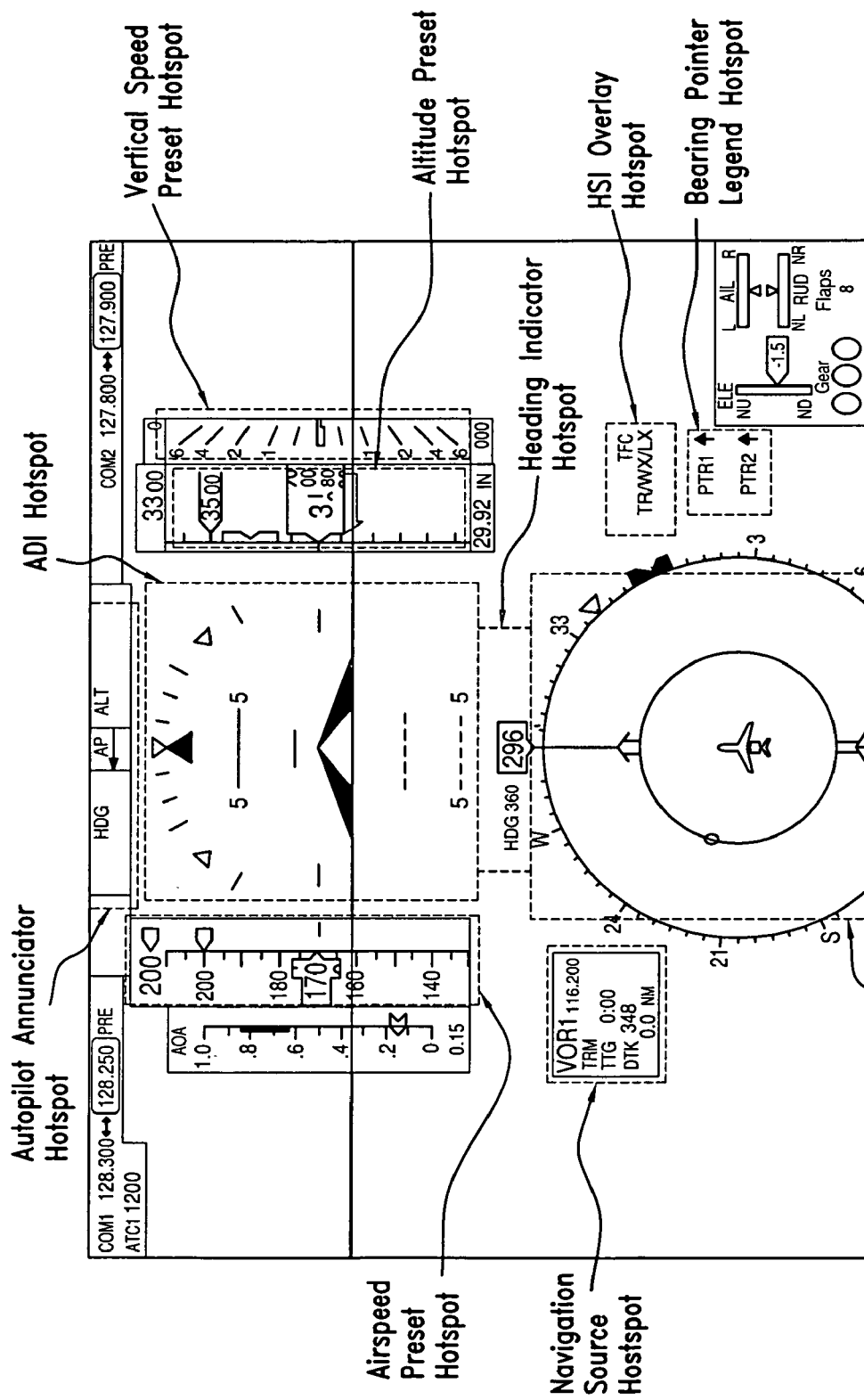
FIG. 4 is a representative flight display with the touchable control areas being shown highlighted.

FIG. 4 again shows the flight display; however, in this instance the touchable control areas are highlighted. The highlighting is in response to a pilot action (such as touching the display in a non-touchable area, or another control means) and provides the pilot with visual cues to touchable area location. The highlighting can be used as a training aid.

Area highlighted may include, for example: Attitude Director Indicator (ADI) format; Horizontal Situation Indicator (HSI) format; Horizontal Situation Indicator (HSI) overlay selection; Bearing pointer selection; NAV Source Selection; Autopilot Mode Selection; Heading Target ("Bug") Selection; Airspeed Target ("Bug") Selection; Altitude Target ("Bug") Selection; and Vertical Speed (VS) Target ("Bug") Selection, as well as others.

Figure 5:
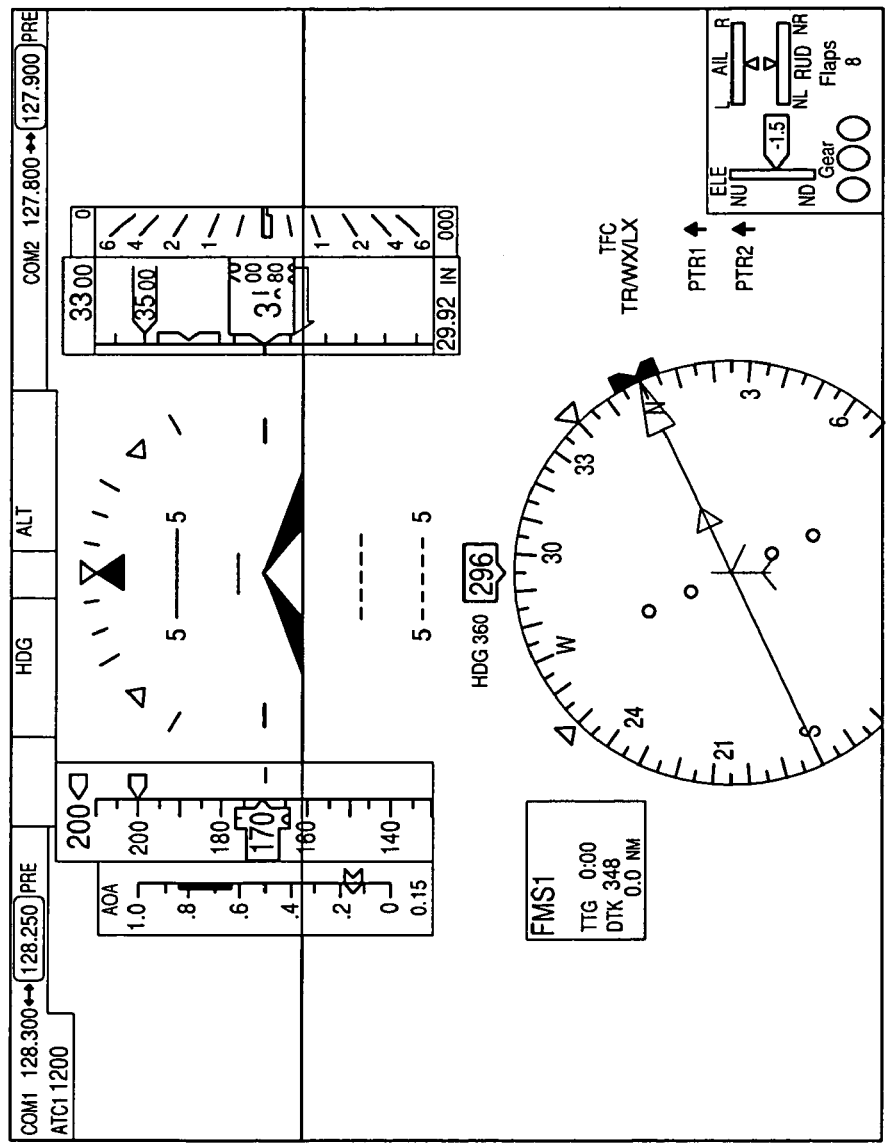
FIG. 5 is a representative flight display in which the Horizontal Situation Indicator (HSI) hotspot has been touched, and the HSI format has been changed from a map presentation to a navigation display presentation.

Referring now to FIG. 5, the flight display is shown in which the Horizontal Situation Indicator (HSI) hotspot has been touched, and the HSI format has been changed from a map presentation to a navigation display presentation.

Figure 6:
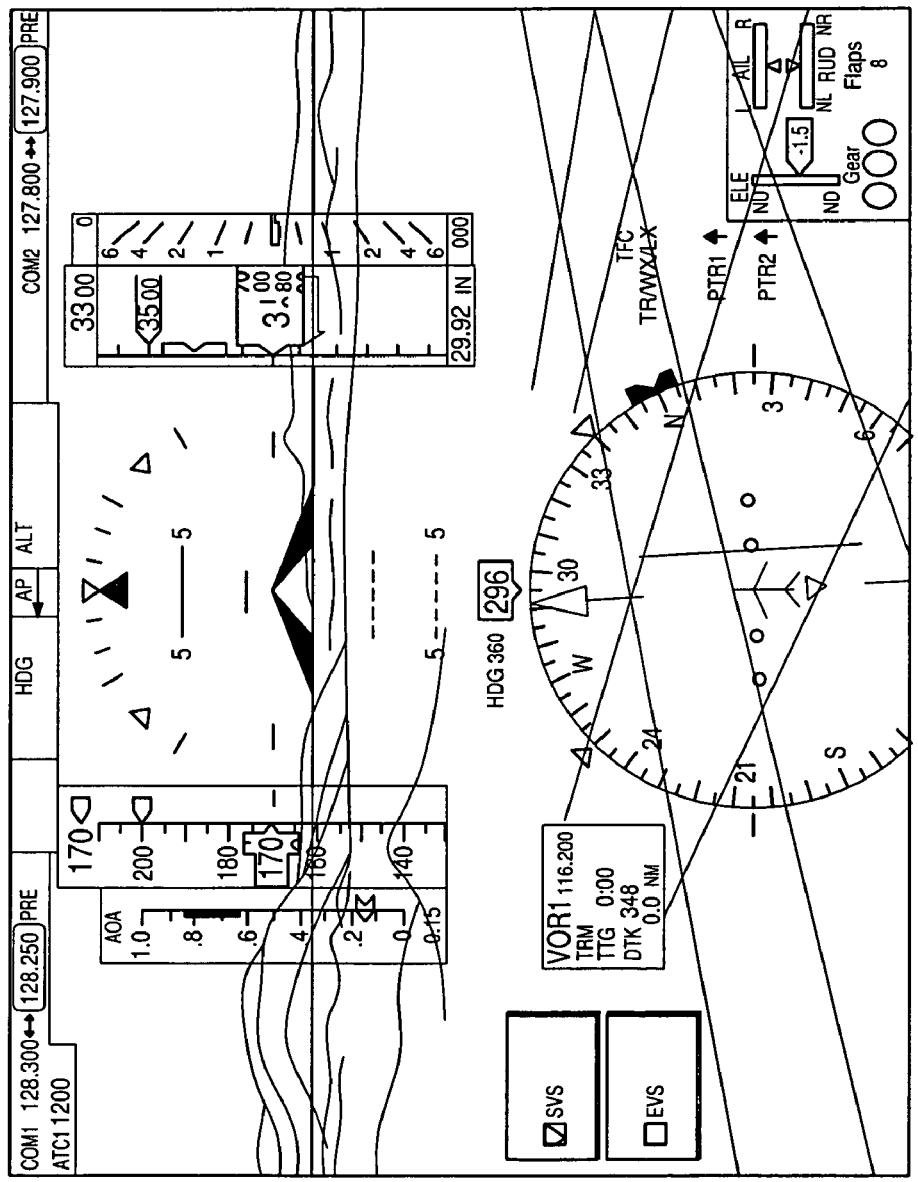
FIG. 6 shows a flight display in which the Attitude Direction Indicator (ADI) Hotspot has been touched to provide an upper menu entry for providing a Synthetic Vision System (SVS) representation.

Referring now to FIG. 6, a flight display is shown in which the Attitude Direction Indicator (ADI) Hotspot has been touched, and a touchable menu is drawn on the left side. The upper menu entry for Synthetic Vision System (SVS) has been touched, and the ADI has been changed to an SVS representation.

Figure 7:
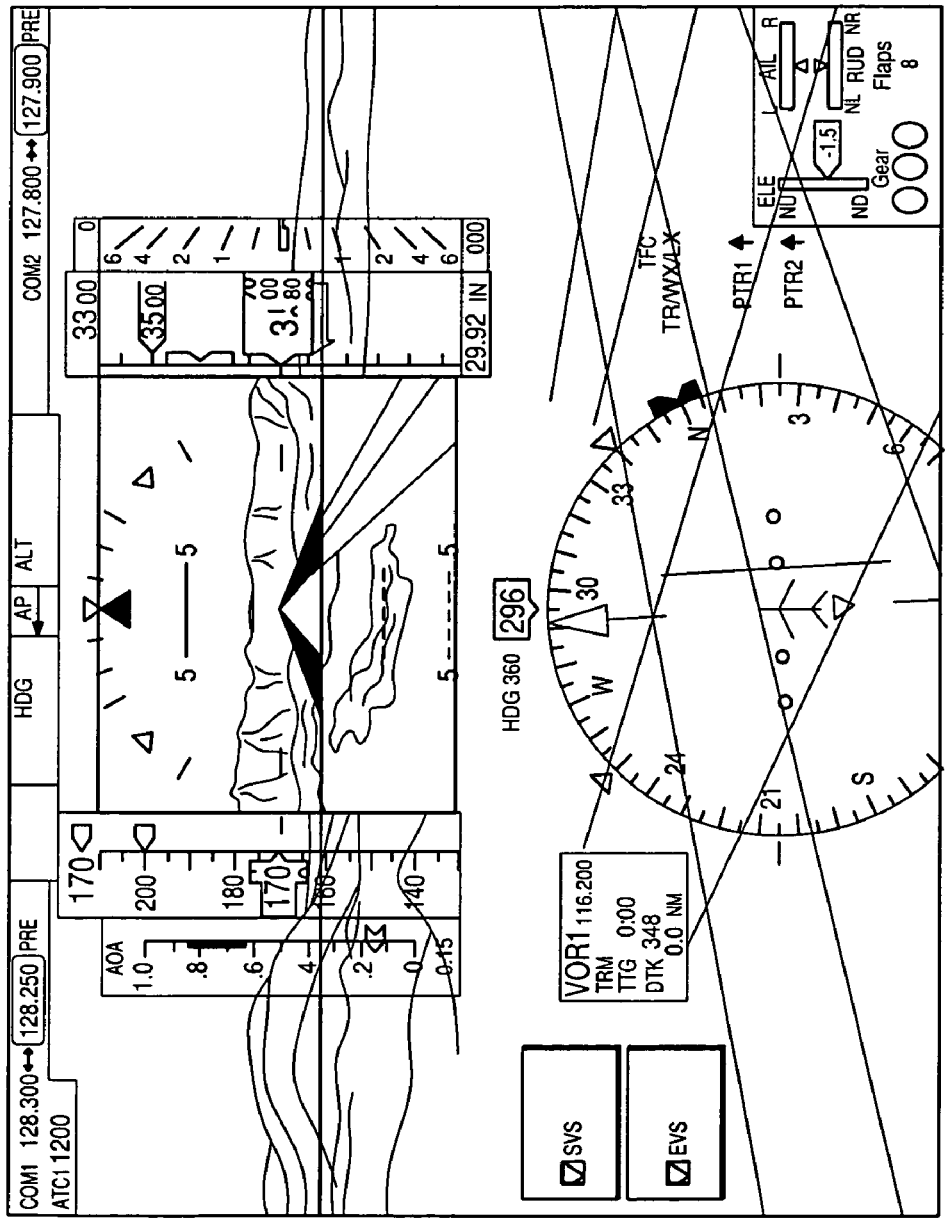
FIG. 7 illustrates a flight display in which the Attitude Direction Indicator (ADI) Hotspot has been touched and the ADI has been changed to include both SVS and EVS representations.

Referring to FIG. 7, the Attitude Direction Indicator (ADI) Hotspot has been touched, and a touchable menu is drawn on the left side. The menu entries for Synthetic Vision System (SVS) and Enhanced Vision System (EVS) have been touched, and the ADI has been changed to include both SVS and EVS representations.

Figure 8:
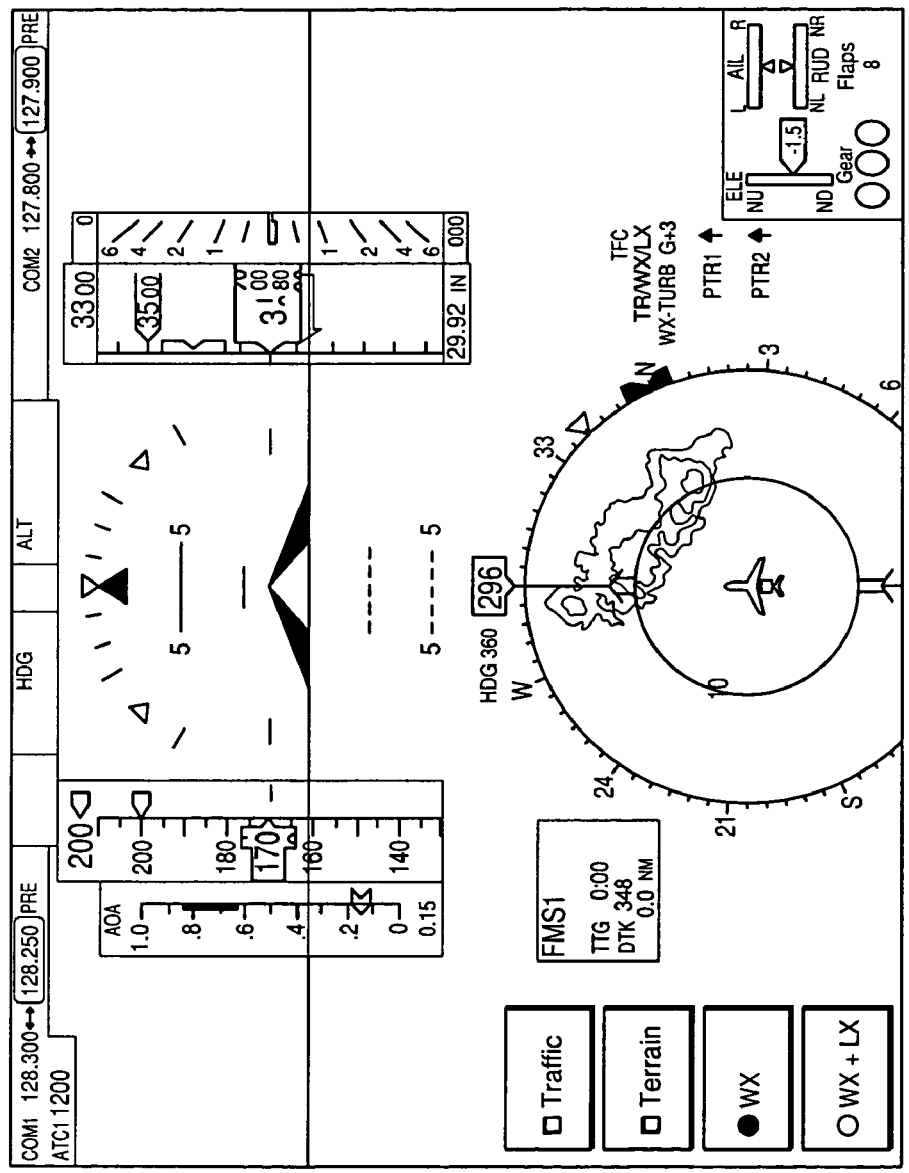
FIG. 8 is a flight display in which the HSI overlay Hotspot has been touched, and a touchable menu is drawn on the left side to provide a menu entry for Weather Radar (Wx) and thus a Weather Radar depiction in the HSI.

Referring now to FIG. 8, the flight display is shown in which the HSI Overlay Hotspot has been touched, and a touchable menu is drawn on the left side. The menu entry for Weather Radar (Wx) has been touched, and the Weather Radar depiction is drawn in the HSI.

Figure 9:
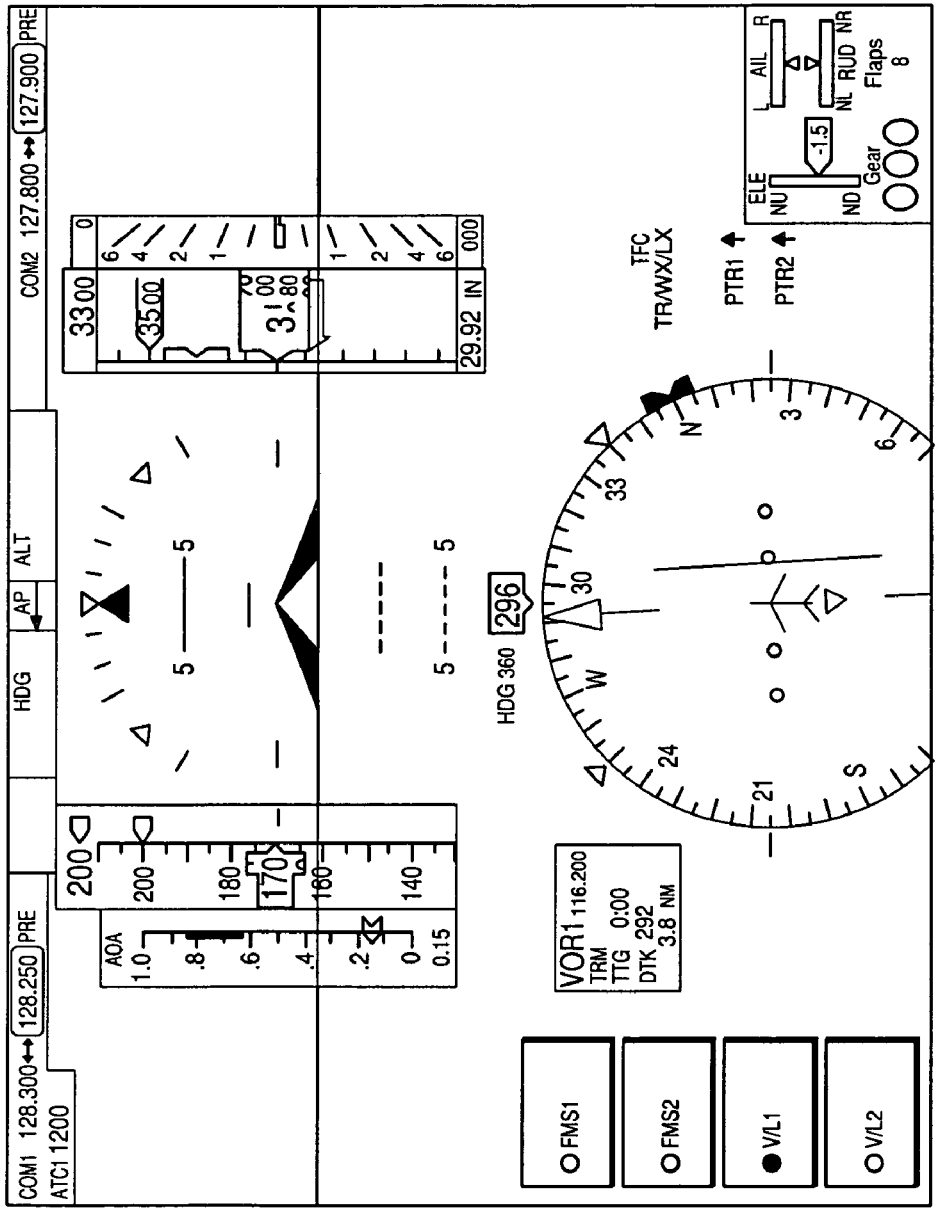
FIG. 9 is a flight display in which the Navigation Source Hotspot has been used to change the navigation source to V/L1.

In FIG. 9, the Navigation Source Hotspot has been touched, and a touchable menu is drawn on the left side. The menu entry for VOR/Localizer 1 (V/L1) has been touched, and the navigation source has been changed to V/L1.

Figure 10:
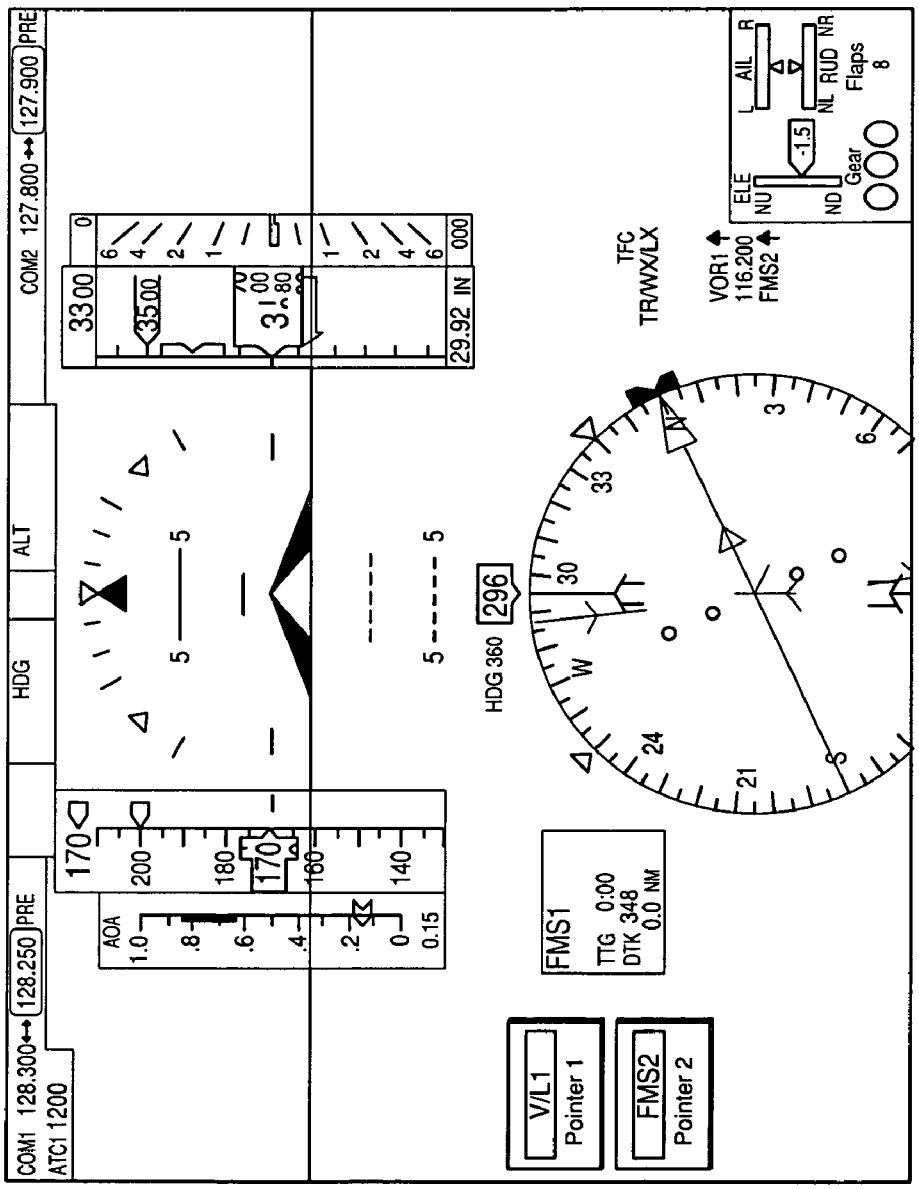
FIG. 10 shows a flight display in which the Bearing Pointer Legend Hotspot has been used to select and display the bearing pointers.

In FIG. 10, the Bearing Pointer Legend Hotspot has been touched, and a touchable menu is drawn on the left side. The menu entries for Pointer 1 and Pointer 2 have each been touched, and the bearing pointers have been selected and displayed.

Figure 11:
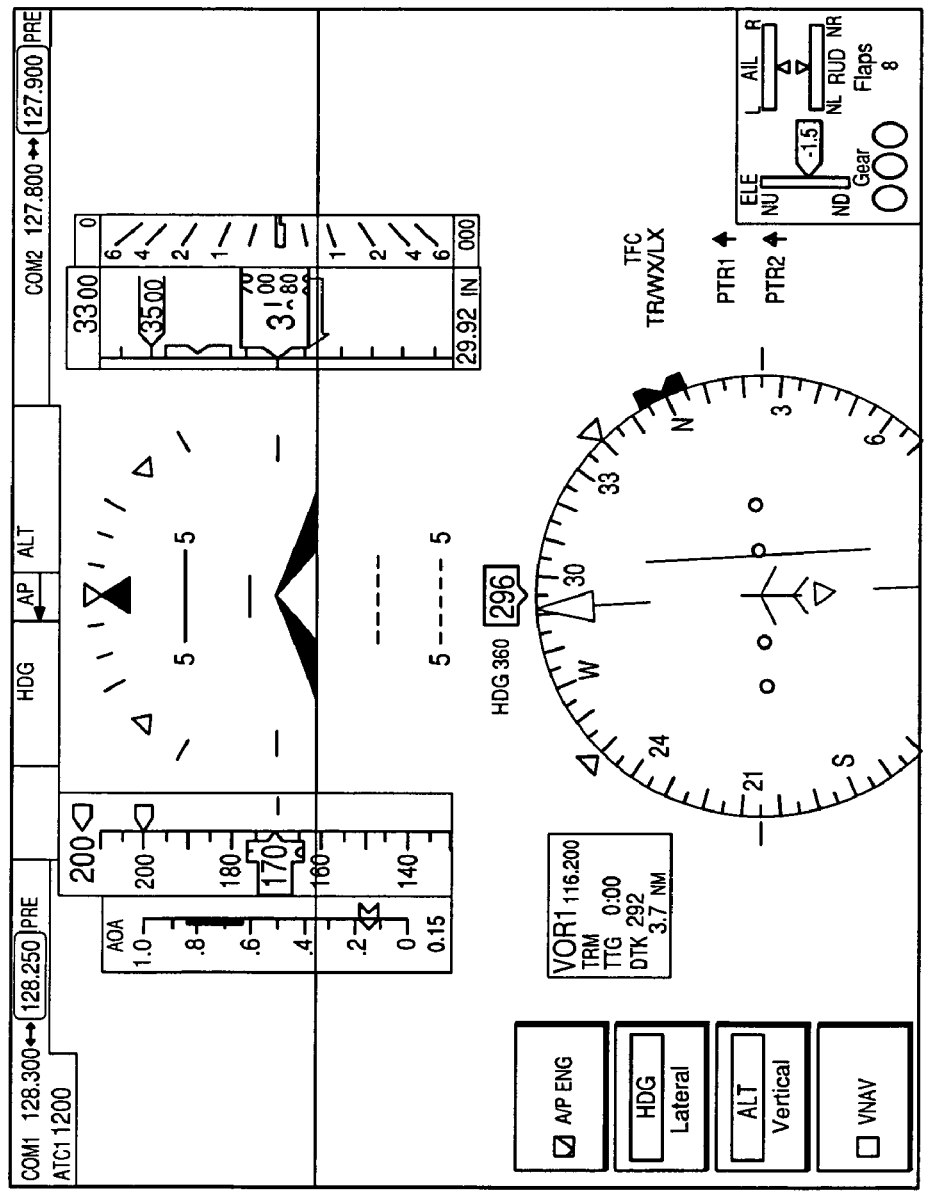
FIG. 11 shows a flight display in which the Autopilot Annunciator Hotspot has been used to route commands to the Autopilot, which has engaged in the requested modes.

Referring now to FIG. 11, the Autopilot Annunicator Hotspot has been touched, and a touchable menu is drawn on the left side. The Lateral and Vertical menu items have been touched, and the A/P ENG (Autopilot Engage) menu item has been touched. The commands have been routed to the Autopilot, which has engaged in the requested modes.

Figure 12:
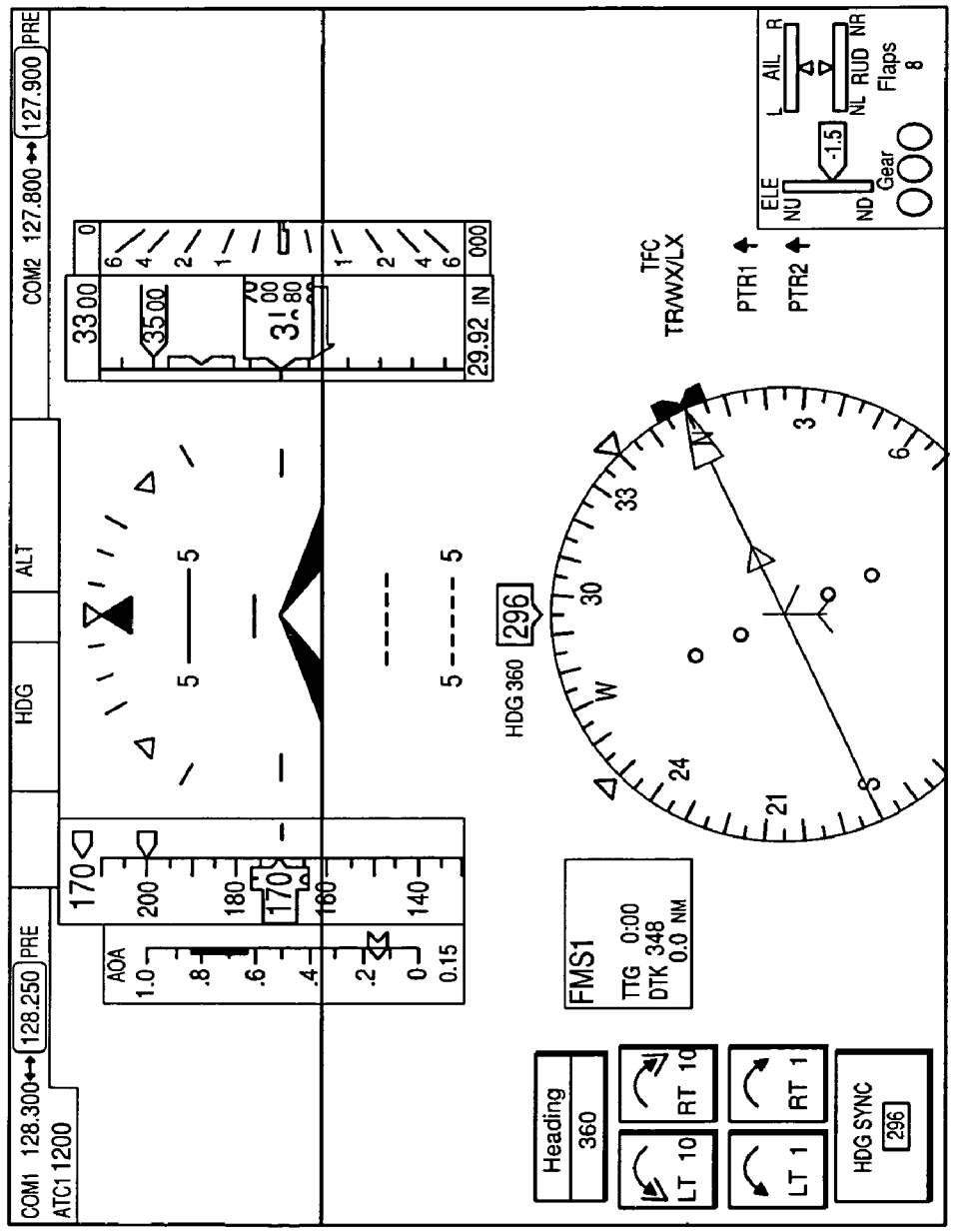
FIG. 12 shows a flight display in which the Heading Indicator Hotspot has been used to modify the selected heading as displayed on the heading indicator.

In FIG. 12, the Heading Indicator Hotspot has been touched, and a touchable menu is drawn on the left side. The touchable menu allows modification (by 10 or 1 degree increments) of the heading indicator.

Figure 13:
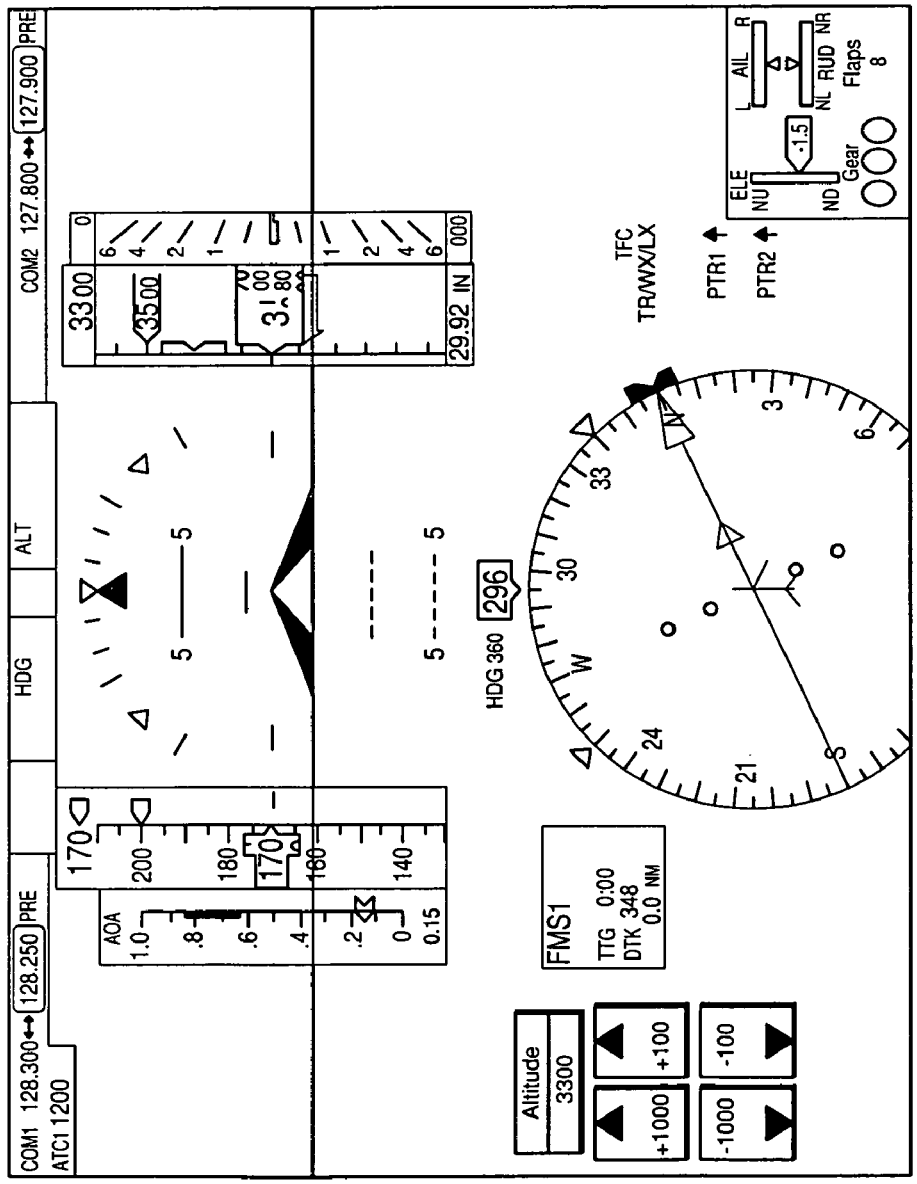
FIG. 13 shows a flight display in which the Altitude Preset Hotspot has been used to allow an incremental modification of the altitude preset.

In FIG. 13, the Altitude Preset Hotspot has been touched, and a touchable menu is drawn on the left side. The touchable menu allows modification (by 100 or 1000 foot increments) of the altitude preset.

Figure 14:
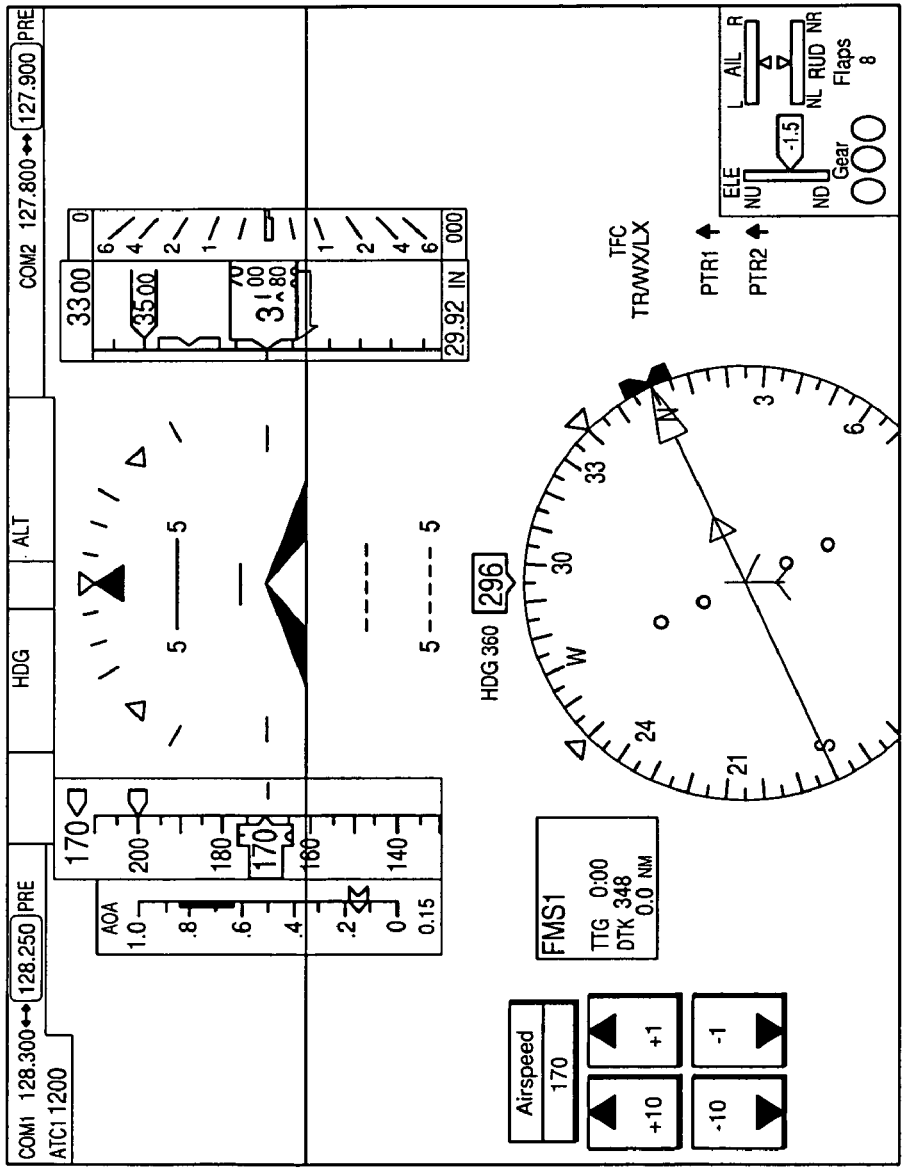
FIG. 14 shows a flight display in which the Airspeed Preset Hotspot has been used to allow an incremental modification of the airspeed preset.

In FIG. 14, the Airspeed Preset Hotspot has been touched, and a touchable menu is drawn on the left side. The touchable menu allows modification (by 10 or 1 knot increments) of the airspeed preset.

Figure 15:
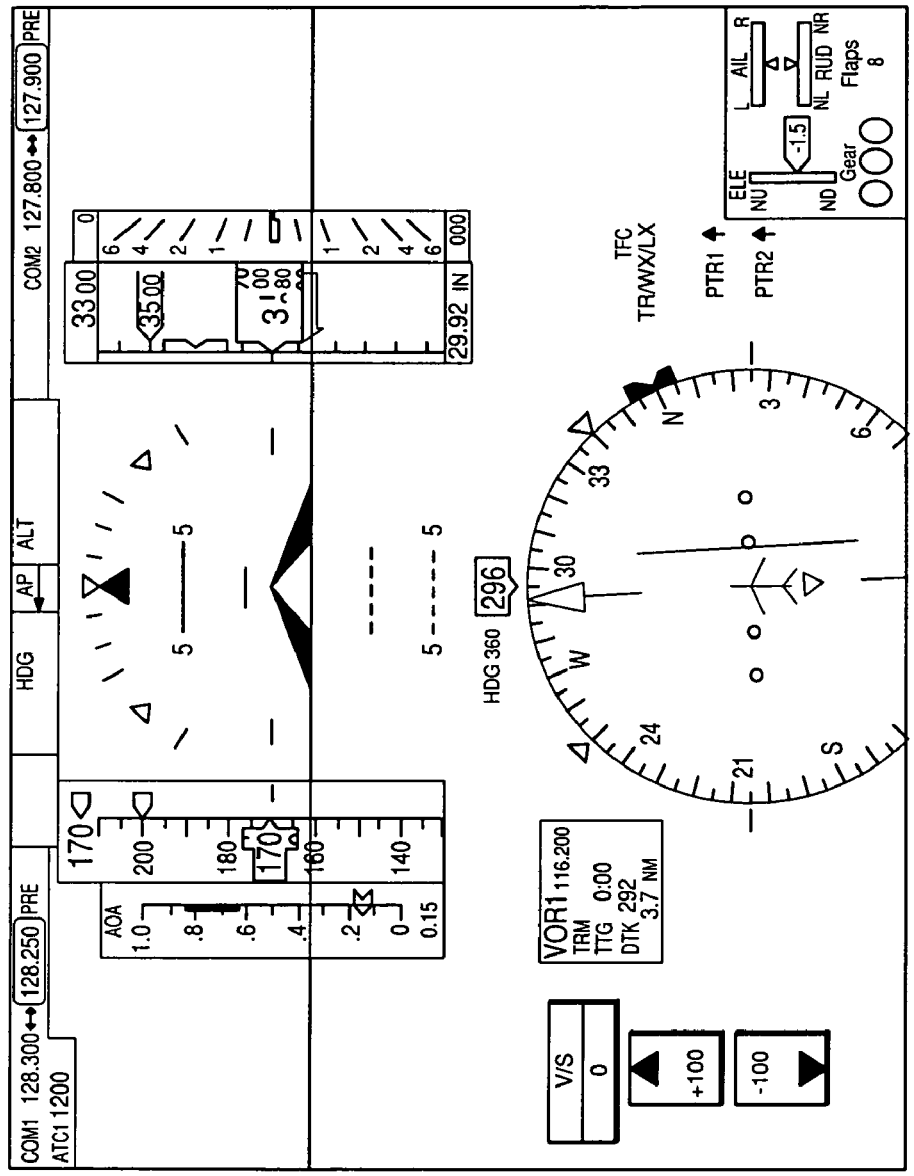
FIG. 15 shows a flight display in which the Vertical Speed Preset Hotspot has been used to allow an incremental modification of the vertical speed preset.

In FIG. 15, the Vertical Speed Preset Hotspot has been touched, and a touchable menu is drawn on the left side. The touchable menu allows modification (by 100 feet/minute increments) of the vertical speed preset.

Other embodiments and configurations may be devised without departing from the spirit of the invention and the scope of the appended claims.

The invention claimed is:

1. An enhanced flight display system for an aircraft, comprising:
    a) primary display controls for providing a primary capability for performing defined display functions;
    b) a flight display including a touchscreen input device being partitioned into a plurality of fixed touch regions that are responsive to touch so as to provide a secondary capability for performing defined flight display functions; and, c) processing means operatively associated with said primary display controls and said flight display for implementing said defined flight display functions in response to utilization of said primary display controls or the touch of one of said touch regions, wherein operation of said fixed touch regions is configured to be independent of said primary display controls; and, wherein said processing means comprises:
  a) a first processing element operatively connected to said primary display controls for processing output signals from said primary display controls to provide a first set of potential display action functions;
  b) a second processing element for processing output signals from said touchscreen input device to provide a second set of potential display action functions; and,
  c) a prioritizer for receiving said first set of potential display action functions and said second set of potential display action functions, said prioritizer for applying a set of priority driven rules for determining the display action.

2. The enhanced flight display system of claim 1 wherein said first processing element and said second processing element are implemented as an integral processing element.

3. The enhanced flight display system of claim 1 wherein at least one of said fixed touch regions provides a touchable menu structure on said touchscreen upon touching thereof.

4. The enhanced flight display system of claim 1 wherein at least one of said fixed touch regions provides an on/off toggle on said touchscreen upon touching thereof.

5. The enhanced flight display system of claim 1 wherein said touch regions comprises primary flight display functions selected from a group, comprising: Attitude Director Indicator (ADI) format; Horizontal Situation Indicator (HSI) format; Horizontal Situation Indicator (HSI) overlay selection; Bearing pointer selection; NAV Source Selection; Autopilot Mode Selection; Heading Target ("Bug") Selection; Speed Target ("Bug") Selection; Altitude Target ("Bug") Selection; and Vertical Speed (VS) Target ("Bug") Selection.

6. The enhanced flight display system of claim 1 wherein said fixed touch regions are defined without additional visual display symbology in the normal mode of operation.

7. The enhanced flight display system of claim 1 wherein said fixed touch regions are highlighted visually when the display touch function is activated outside of a fixed touch region.

8. The enhanced flight display system of claim 7, wherein the highlighting is accomplished by means of translucent shading or display of a border around the fixed touch region.

9. The enhanced flight display system of claim 7, wherein the highlighting appears in response to a touch outside a fixed touch region, or in response to a control input of any other type.

10. The enhanced flight display system of claim 7, wherein the highlighting may be temporary (lasting until the touch or control input is removed), time-limited (lasting for a fixed duration after a touch or control input), or permanent (lasting until a second touch or control input occurs).

11. A method for enhanced operation of a flight display system for an aircraft, comprising the steps of:
  a) performing defined display functions using primary display controls for providing a primary capability for performing said flight display functions;
  b) performing defined flight display functions using a touchscreen input device being partitioned into a plurality of fixed touch regions that are responsive to touch so as to provide a secondary capability for performing said defined flight display functions; and,
  c) implementing said defined flight display functions in response to utilization of said primary display controls or the touch of one of said touch regions utilizing processing means operatively associated with said primary display controls and said flight display, wherein operation of said fixed touch regions is configured to be independent of said primary display controls, and wherein said step of implementing comprises the steps of:
    a) processing output signals from said primary display controls using a first processing element operatively connected to said primary display controls to provide a first set of potential display action functions;
    b) processing output signals from said touchscreen input device using a second processing element to provide a second set of potential display action functions; and,
    c) using a prioritizer for receiving said first set of potential display action functions and said second set of potential display action functions and for applying a set of priority driven rules for determining the display action.

* * * * *